UNITED STATES PATENT OFFICE.

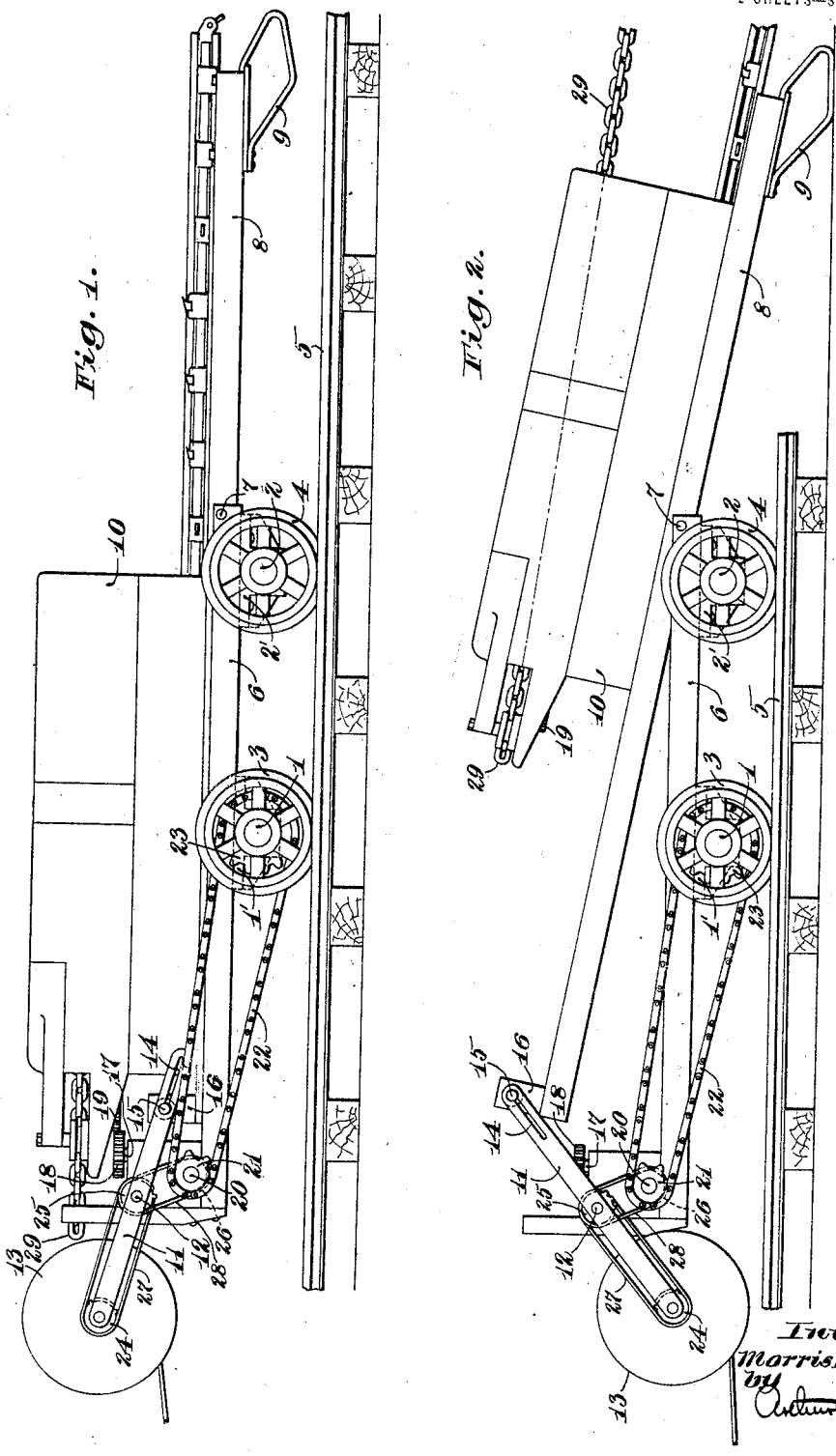

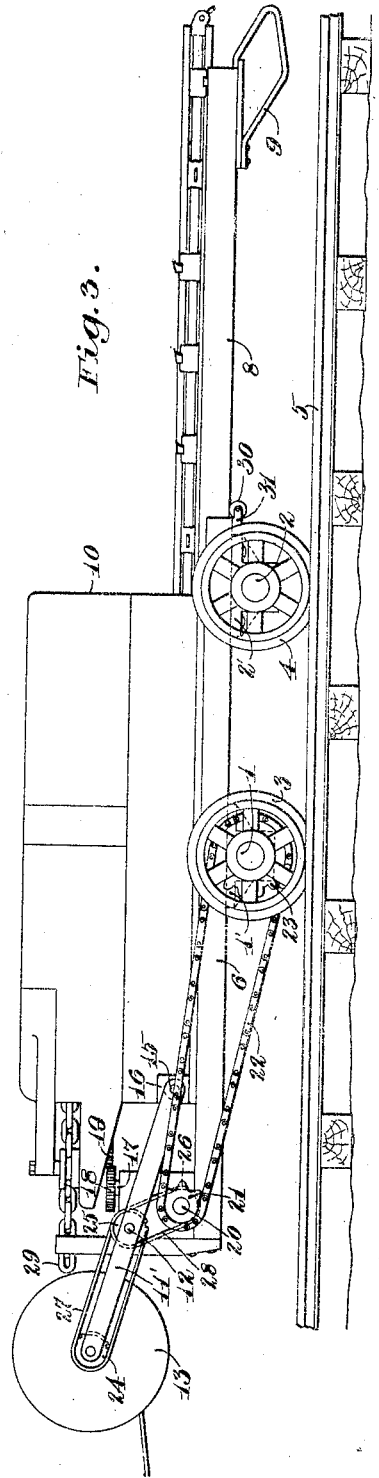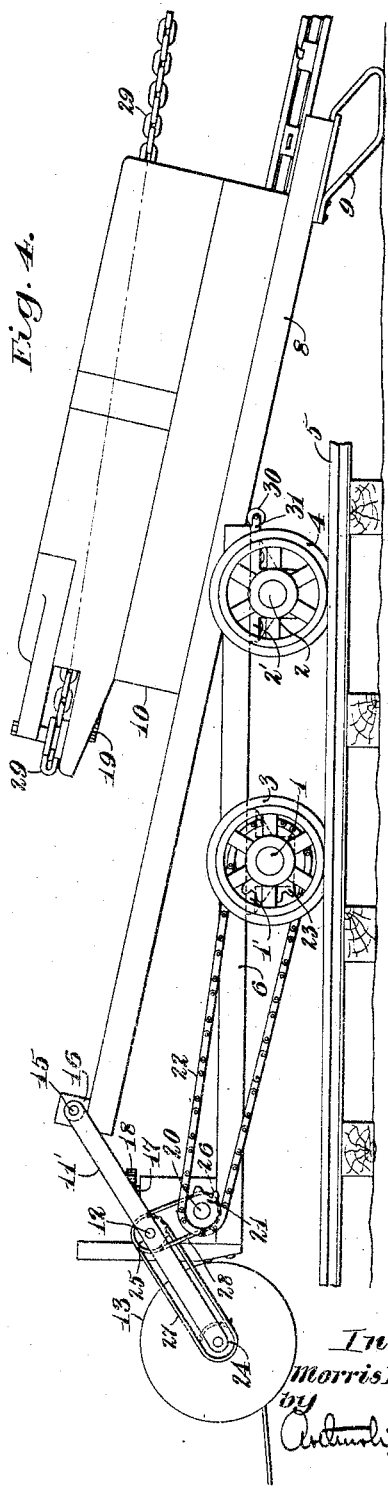

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,814.    Specification of Letters Patent.    Patented May 17, 1921.

Application filed December 11, 1918, Serial No. 266,318. Renewed February 3, 1921. Serial No. 442,327.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide a counterbalanced, tilting, solid frame truck which will remain in a tilted position after the unloading of the mining machine but which will be automatically returned to a horizontal position when the machine is loaded onto the truck.

This improved truck possesses the advantages of the solid frame trucks now in use in that the bed or main truck frame is solid and substantial, without having the disadvantages of that type of truck in which the rear wheels are raised from the track during the unloading operation and are permitted to fall on the track after the mining machine is unloaded, with a resulting breakage of car wheels, cable reel supports, and, frequently, a derailing of the truck.

In the accompanying drawings I have shown for purposes of illustration several embodiments which my invention may assume in practice.

In these drawings,—

Figure 1 is a side elevation of my improved truck with the mining machine thereon in loaded position.

Fig. 2 is a side elevation of the truck with the mining machine unloading therefrom.

Figs. 3 and 4 are views similar to Figs. 1 and 2, respectively, but of a modified form of truck.

Referring to the drawings, I have there shown for the purpose of illustrating the principal features of the invention, a four-wheel truck having a plurality of axles 1 and 2 carrying wheels 3 and 4 adapted to run on a track 5. A small truck frame 6 is mounted on the axles 1 and 2 by means of axle boxes 1' and 2' in such a manner that this wheeled frame forms a unit. This frame 6 extends for some distance to the rear of the rear wheel 3 but extends but a short distance in front of the front wheel 4.

Pivotally mounted, as shown at 7, to the front end of the small truck frame 6, is a larger or main truck frame 8 which extends rearwardly to a point adjacent the other end of the smaller or supplemental frame 6 and extends in front of the wheeled unit for nearly an equal distance and carries on this end a loading shoe 9 which limits the swinging or tilting movement of the main frame on its pivot. This main frame is preferably formed as a single unit adapted to receive a mining machine 10 in the position shown in Fig. 1, which is termed the "loaded" position, and is also adapted to tilt, as is shown in Fig. 2, under the weight of the machine to permit the loading or unloading of the latter from the truck.

It is essential to the proper operation of the truck that the main frame remain in an inclined or tilted position after the machine has been unloaded in order that the machine may be readily reloaded. For this purpose I have provided a counterbalancing means adapted to engage the main frame to normally hold the frame 8 tilted when the mining machine is not on the truck. In my preferred form, this counterbalancing means consists of a pair of levers 11 on each side of the frame 6 (only one being shown) pivotally mounted on a bolt or rod 12 preferably carried on the rear end of the frame 6, and a heavy reel 13 rotatably supported between the levers 11 at the rear ends of the latter. This reel, in common practice, weighs about three hundred pounds and is of a type commonly mounted on mining machine trucks for carrying the cable or hose for supplying the electricity or compressed air to the mining machine motor. The forward end of each of the levers 11 is connected by means of a slot 14 therein and a bolt 15 passing therethrough, with the adjacent end of the main frame 8, the bolt for this purpose being mounted on a stud or block 16 rigidly secured to this end of the frame.

As is common on mining machine trucks, there is provided a truck driving mechanism whereby the machine motor may be utilized to propel the truck along the track. As shown, this mechanism consists of a substantially vertically disposed shaft 17 connected with the machine motor through spur gears 18, 19 and connected with a horizontal shaft 20 through a worm and worm gear (not shown), the rotation of the shaft 20 being transmitted to the axle 1 through a sprocket 21 mounted on the shaft 20, a chain 22, and a sprocket 23 mounted on the axle 1. Obviously, the truck is driven in one direction or the other along the track by the motor, it only being necessary to reverse the motor in the case of an electrically driven machine, or to operate a reversing mechanism in the case of an air driven machine, to reverse the direction of movement of the truck.

In connection with the use of the reel 13, I have provided a positive driving connection with the shaft 20 so that the latter causes the reel to rotate to let out or pick up the hose or cable as the machine moves along the track. As shown, this connecting means consists of a sprocket 24 mounted on the drum, two sprockets 25 mounted on the rod 12 for rotation in unison, and a sprocket 26 mounted on the shaft 20 and attached thereto, chains 27, 28 being passed over these sprockets in pairs so that the rotative movement of the shaft causes the drum to rotate.

An extended description of the operation of this device appears to be unnecessary, it being apparent that as the mining machine is being unloaded from the truck by means of the usual feed chain 29, the weight of the machine will tilt the main frame on its pivot until the shoe strikes the mine floor, when the machine may be run off. During this tilting movement, the supplemental frame 6 remains stationary and the wheels thereof remain on the track, but the reel drops to the position shown in Fig. 2. After the machine has cleared the truck, the main frame or bed is retained in a tilted position by the counterweight or reel. As the machine is reloaded on the truck, its weight will overcome the counterbalancing action of the reel and will return the parts to the positions shown in Fig. 1. The reel will, however, dampen the movement of the mining machine about the pivot and will tend to prevent a rapid tilting of the main frame onto the wheeled frame.

In the modification illustrated in Figs. 3 and 4, the construction and operation is essentially the same, it being noted that the lever 11' does not have a slot to permit the movement of the bolt 15 longitudinally along the lever, and that the main frame or bed 8 is not pivotally connected on the wheeled frame but is loosely mounted thereon and is adapted to slide back and forth as the machine is loaded and unloaded. To decrease the friction and to a large extent the resulting shearing action on the rod 12 and bolt 15, a roller 30 is attached, as by brackets 31, to the front end of the wheeled frame 6. The operation of this modified form of truck does not require elaboration, it being clear that the toggle action of the lever 11' and frame 8 will cause the frame to move rearwardly (or toward the left as shown in the drawings) and tilt as the mining machine moves to the right and passes the roller. The feature of permitting simultaneous sliding and tilting of the frame 8 is broadly covered in my copending application, Serial No. 279,866, filed February 28, 1919.

While I have in this application specifically described two embodiments which my invention may assume in practice, it is to be understood that these forms are shown for illustrative purposes and that the invention may be modified and embodied in various other forms without departing from its spirit.

What I claim as new and desire to secure by Letters Patent is:

1. In a mining machine truck, a wheeled frame, a machine carrying body pivoted at the front end thereof and tiltable by a mining machine movable thereover, and counterbalancing means having a fixed pivotal connection with said frame and engaging said body for normally retaining the latter in an inclined position.

2. In a mining machine truck, a wheeled frame, a machine carrying body pivoted at the front end thereof and tiltable by a mining machine movable thereover, and reel supporting means having a fixed pivotal connection with said frame and engaging said body for normally retaining the latter in an inclined position.

3. In a mining machine truck, a wheeled frame, a machine carrying body pivoted at the front end thereof and tiltable by a mining machine movable thereover, and counterbalancing means having a fixed pivotal connection with said frame and a pivotal connection with said body for normally retaining the latter in an inclined position.

4. In a mining machine truck, a wheeled frame, a machine carrying body pivoted at the front end thereof and tiltable by a mining machine movable thereover, and reel supporting means having a fixed pivotal connection with said frame and a pivotal connection with said body for normally retaining the latter in an inclined position.

5. In a mining machine truck, a wheeled frame having truck driving mechanism mounted thereon, a machine carrying body pivoted at the front end thereof and tiltable by a mining machine movable thereover, reel supporting means having a fixed pivotal connection with said frame and a pivotal connection with said body for normally retaining the latter in an inclined position, and means mounted on said wheeled frame for rotating the reel.

6. In a mining machine truck, a wheeled frame, a machine carrying body pivoted at the front end thereof and tiltable by a mining machine movable thereover, and counterbalancing means having a fixed pivotal connection with said frame and a sliding pivotal connection with said body for normally retaining the latter in an inclined position.

7. In a mining machine truck, a wheeled frame, a machine carrying body pivoted at the front end thereof and tiltable by a mining machine movable thereover, and reel supporting means having a fixed pivotal connection with said frame and a sliding pivotal connection with said body for normally retaining the latter in an inclined position.

8. In a mining machine truck, a wheeled frame, a machine carrying body mounted on said frame and having a fixed pivotal connection therewith and tiltable by a mining machine movable thereover, and reel supporting means having a fixed pivotal connection with said frame and a sliding pivotal connection with said body for normally retaining the latter in an inclined position.

9. In a mining machine truck, a wheeled frame, a machine carrying body pivoted at the front end thereof and tiltable by a mining machine movable thereover, counterbalancing means therefor including a member having a fixed pivotal connection with said frame, and operative connections between the front end of said member and the rear end of said body.

10. In a mining machine truck, a wheeled frame, a machine carrying body pivoted at the front end thereof and tiltable by a mining machine movable thereover, counterbalancing means therefor including a member having a fixed pivotal connection with said frame, and means forming a pivotal connection between the front end of said member and the rear end of said body.

11. In a mining machine truck, a wheeled frame, a machine carrying body pivoted at the front end thereof and tiltable by a mining machine movable thereover, truck driving mechanism on said frame, a reel supporting member pivoted on a fixed pivot to said frame, and an operative connection between the front end of said member and the rear end of said body.

12. In a mining machine truck, a wheeled frame, a machine carrying body pivoted thereon and tiltable by a mining machine movable thereover, truck driving mechanism on said frame, and means on said frame and operatively connected to said body for maintaining the latter in tilted position.

13. In a mining machine truck, a wheeled frame, a machine carrying body pivoted thereon and tiltable by a mining machine movable thereover, truck driving mechanism on said frame, and reel carrying means on said frame and operatively connected to said body for maintaining the latter in tilted position.

14. In a mining machine truck, a wheeled frame, a machine carrying body pivoted at the front end thereof, and tiltable by a mining machine movable thereover, and means having a fixed pivotal connection with said frame and extending between the latter and said body for normally retaining the latter in inclined position, said means being controlled by said machine in its movements on and off said truck.

In testimony whereof I affix my signature.

MORRIS P. HOLMES.